(12) United States Patent
Yu

(10) Patent No.: US 12,491,834 B2
(45) Date of Patent: Dec. 9, 2025

(54) AUTOMOBILE FENDER

(71) Applicant: JCsportline Co., Ltd., Jingmen (CN)

(72) Inventor: Chunguang Yu, Jingmen (CN)

(73) Assignee: JCsportline Co., Ltd., Jingmen (CN)

( * ) Notice: Subject to any disclaimer, the term of this patent is extended or adjusted under 35 U.S.C. 154(b) by 360 days.

(21) Appl. No.: 18/449,915

(22) Filed: Aug. 15, 2023

(65) Prior Publication Data

US 2025/0058728 A1 Feb. 20, 2025

(51) Int. Cl.
*B62D 25/02* (2006.01)
*B60R 19/02* (2006.01)
*B62D 25/16* (2006.01)

(52) U.S. Cl.
CPC ............ *B60R 19/023* (2013.01); *B62D 25/02* (2013.01); *B62D 25/16* (2013.01)

(58) Field of Classification Search
CPC ...... B62D 25/02; B62D 25/08; B62D 25/082; B62D 25/088; B62D 25/16; B62D 25/163; B62D 27/04; B60R 2021/343; B60R 19/023; B60R 2019/002
USPC .................... 293/31, 34; 296/187.09, 187.12
See application file for complete search history.

(56) References Cited

U.S. PATENT DOCUMENTS

| | | | | |
|---|---|---|---|---|
| 2005/0057076 A1* | 3/2005 | Roux | .................. | B62D 25/163 296/187.04 |
| 2007/0262615 A1* | 11/2007 | Koizumi | ................ | B62D 25/08 296/201 |
| 2008/0169681 A1* | 7/2008 | Hedderly | ............... | B60J 5/0466 296/193.07 |
| 2009/0174199 A1* | 7/2009 | Rinderlin | ............. | B62D 25/163 293/132 |
| 2016/0031487 A1* | 2/2016 | Steinhilb | .............. | B62D 25/163 296/187.04 |
| 2016/0159398 A1* | 6/2016 | Kobayashi | ............. | B62D 21/15 293/155 |
| 2017/0166259 A1* | 6/2017 | Kim | ..................... | B62D 25/081 |
| 2020/0031403 A1* | 1/2020 | Aso | ........................ | B62D 25/18 |
| 2023/0331313 A1* | 10/2023 | Hayashi | ................. | B62D 25/18 |
| 2024/0253716 A1* | 8/2024 | Wolf | ....................... | F16B 5/126 |
| 2025/0058728 A1* | 2/2025 | Yu | .......................... | B60R 21/34 |

* cited by examiner

*Primary Examiner* — Gregory A Blankenship
(74) *Attorney, Agent, or Firm* — Westbridge IP LLC

(57) ABSTRACT

Disclosed is an automobile fender, and relates to the technical field of automobile parts. A kinetic energy absorber as a whole is continuously and vertically bent at right angles, so that when impacted, a fender main body is deformed at right angle bends of the kinetic energy absorber, so as to absorb the kinetic energy to the greatest extent, reduce the deformation range of the fender main body, and avoid the fender main body from moving to and squeezing a front side of an automobile. When the impact squeezing range is large and the fender main body is driven to move to a squeezing guide piece, a mounting inserting rod is broken first, and the fender main body moves outwards along a cambered surface of the squeezing guide piece, thereby avoiding the fender main body from squeezing a door body even under continuous impact.

6 Claims, 5 Drawing Sheets

AUTOMOBILE FENDER

TECHNICAL FIELD

The application relates to the technical field of automobile parts, and more specifically, to an automobile fender.

BACKGROUND

At present, various automobile manufacturing enterprises are studying how to ensure both the strength of an automobile body and minimize the injury of automobiles to pedestrians in the event of a collision between the pedestrians and the automobiles. Most of the collisions between the pedestrians and the automobiles occur at a front end of the automobile. Fenders of the automobile are located at the front end of the automobile, on both sides of a hood, and above tires, and become an important part of automobile styling as well as a main area where collisions between the pedestrians and a head of the automobile occur. With the popularity of passenger vehicles, China has become a big automobile consumer. The collision maintenance cost of the passenger vehicle is closely related to the crashworthiness of a low-speed collision structure. Therefore, in order to promote the safety classification of automobile insurance and promote the refined development of vehicle model pricing, under the guidance of The Insurance Association of China, China Automotive Engineering Research Institute and CIRI Auto Technology Institute have proposed a China Insurance Automotive Safety Index (C-IASI) test and evaluation system based on comprehensive research and reference to international advanced experience, while taking into account the current situation of China insurance and vehicle safety technology.

An existing automobile fender is like an anti-distortion automobile fender according to Application No. CN202022357868.0, in which one end of a baffle plate is rotatably connected to a fender through a hinge, and the other end of the baffle plate is clamped to the fender through a fastener. A bolt penetrates between a first fixing piece and a second fixing piece, and the diameter of the bolt is slightly less than that of a through hole. Compared with the related art, the application has the following beneficial effects that the application is scientific and reasonable in structure, and safe and convenient to use; the existing fender is thickened, and a vertical steel plate is additionally arranged in the middle of the fender, so that the strength of the fender is enhanced; sound insulation cotton is added into the fender, and noise generated by tires is effectively reduced; and springs are mounted at connecting positions of the fender, so that the fender is protected against elastic deformation and deformation caused by the external force after being slightly collided, and the situation that the fender is deformed and distorted due to the external force is reduced.

However, when a low-speed collision occurs at a head of the existing fender, the fender often squeezes a front side door, resulting in damage to the automobile fender and a front door, and closure of a gap between closing parts. At the same time, the fender often needs to be replaced and a metal plate of the front side door needs to be corrected, resulting in high maintenance cost, and the easily movable fender is also prone to jamming the connection position between the door and an automobile body, resulting in difficulty in door opening.

SUMMARY

The application aims to solve the technical problem in the related art that a fender is prone to being squeezed by a front side door after being impacted, resulting in damage to the door and difficulty in opening.

The objectives and effects of the application are achieved by the following specific technical means.

An automobile fender includes a fender main body. A right side of the fender main body is provided with a first connecting plate, a lower side of the fender main body is provided with a second connecting plate, and the second connecting plate is arc-shaped. A kinetic energy absorber is mounted in the fender main body, a squeezing guide piece is mounted at one side of the fender main body, one side, which is in contact with the squeezing guide piece, of the fender main body is a cambered surface, one side, close to the squeezing guide piece, in the fender main body is provided with a mounting groove, a first hinged seat is mounted in the mounting groove, the first hinged seat is connected to a guide rod, and one side of the squeezing guide piece is provided with the first hinged seat which is the same as the fender main body. A side buffer strip is mounted at a left side of the squeezing guide piece, a spring is arranged between the left side of the squeezing guide piece and the side buffer strip, the side buffer spring is provided with a clamping piece connected to an automobile body, one side, close to the side buffer strip, of the squeezing guide piece is provided with a baffle plate, and the baffle plates on both sides are partially overlapped.

Further, the kinetic energy absorber is made of aluminum, the thickness is between 2 mm and 4 mm, and the kinetic energy absorber as a whole is continuously and vertically bent at right angles.

Further, one side, which is in contact with the fender main body, of the squeezing guide piece is connected to a mounting inserting rod, and the fender main body is provided with an inserting groove matched with the mounting inserting rod, so as to ensure that the fender main body and the squeezing guide piece are connected.

Further, the first hinged seat on the squeezing guide piece extends into the mounting groove and is connected to the other end of the guide rod, and the squeezing guide piece and the first hinged seat on the fender main body are arranged in a mutually staggered manner.

Further, a telescopic sleeve and a telescopic rod are mounted between the side buffer strip and the squeezing guide piece, and the telescopic sleeve is sleeved over an outer side of the telescopic rod.

Further, a plurality of groups of structures composed of the telescopic sleeve and the telescopic rod are arranged in a longitudinal gap between the squeezing guide piece and the side buffer strip at equal intervals.

The automobile fender has the following beneficial effects.

1. The kinetic energy absorber is mounted in the fender main body, the kinetic energy absorber is made of aluminum, the thickness is between 2 mm and 4 mm, and the kinetic energy absorber as a whole is continuously and vertically bent at right angles, so that when impacted, the fender main body is deformed at right angle bends of the kinetic energy absorber, so as to absorb the kinetic energy to the greatest extent, reduce the deformation range of the fender main body, and avoid the fender main body from moving to and squeezing a front side of an automobile.

2. The squeezing guide piece is mounted at the left side of the fender main body, and one side, which is in contact with the squeezing guide piece, of the fender main body is the cambered surface, so that when the impact squeezing range is large and the fender main body is driven to move to the squeezing guide piece, the mounting inserting rod is broken first, and the fender main body moves outwards along the cambered surface of the squeezing guide piece, thereby avoiding the fender main body from squeezing a door body even under continuous impact. One side, close to the squeezing guide piece, in the fender main body is provided with the mounting groove, the first hinged seat is mounted in the mounting groove, the first hinged seat is connected to the guide rod, one side of the squeezing guide piece is provided with the first hinged seat which is the same as the fender main body, extends into the mounting groove, and is connected to the other end of the guide rod, and the squeezing guide piece and the first hinged seat on the fender main body are arranged in a mutually staggered manner, so that when the fender main body moves to the squeezing guide piece, the first hinged seat is ejected out under the action of the inclined guide rod, so as to improve the deflection efficiency of the fender after being squeezed to move.

3. The side buffer strip is mounted at the left side of the squeezing guide piece, the spring is arranged between the left side of the squeezing guide piece and the side buffer strip, the side buffer spring is provided with the clamping piece connected to the automobile body, the telescopic sleeve and the telescopic rod are mounted between the side buffer strip and the squeezing guide piece, and the telescopic sleeve is sleeved over an outer side of the telescopic rod, so that when deflecting from the moving direction of the fender main body, the squeezing guide piece squeezes the spring between the squeezing guide piece and the buffer side strip, thereby further absorbing the kinetic energy transmitted by the fender main body, achieving the effect of zero contact with the front side of the vehicle, and improving a safety evaluation index.

DETAILED DESCRIPTION OF THE EMBODIMENTS

The technical solutions in the embodiments of the application will be clearly and completely described in conjunction with the drawings in the embodiments of the application.

Figure 1:
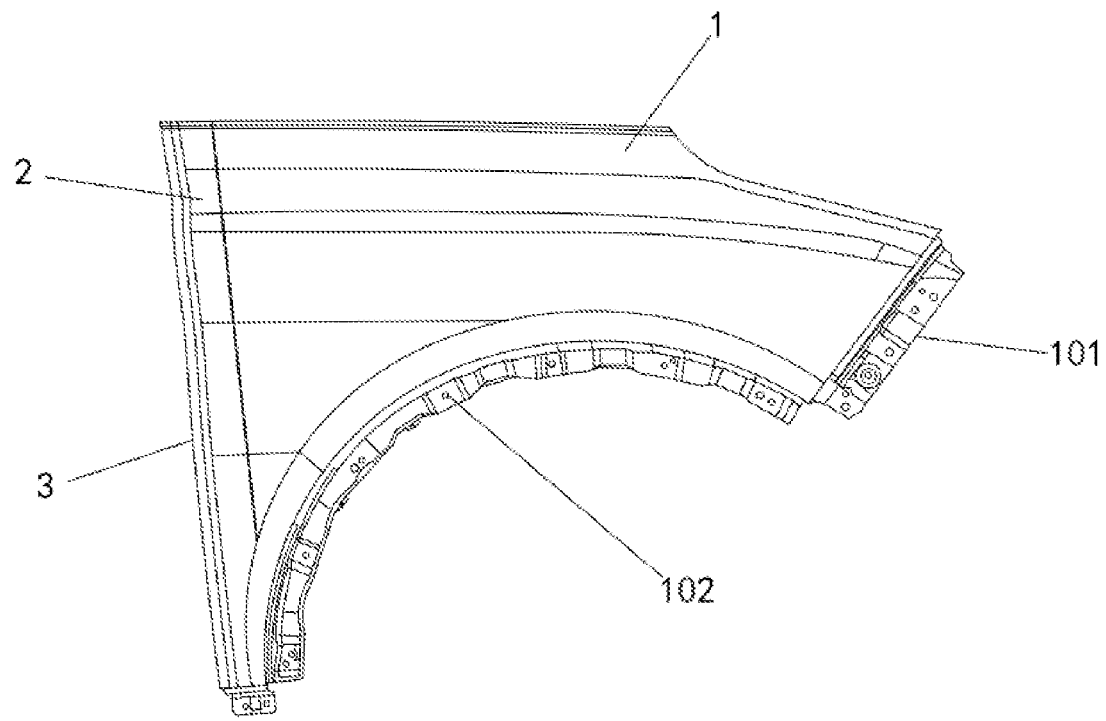
FIG. 1 is an overall schematic diagram of the application.
Figure 2:
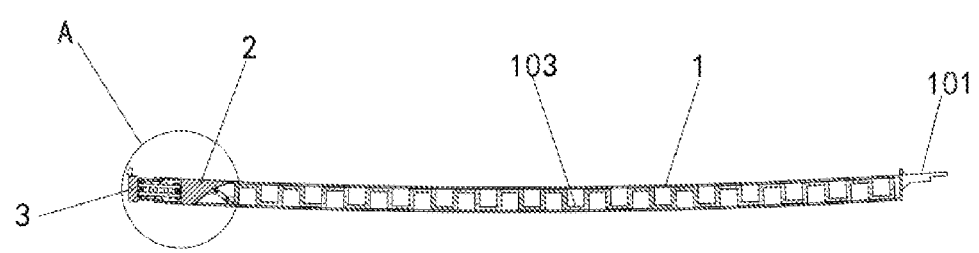
FIG. 2 is a top sectional diagram of a fender main body of the application.
Figure 3:
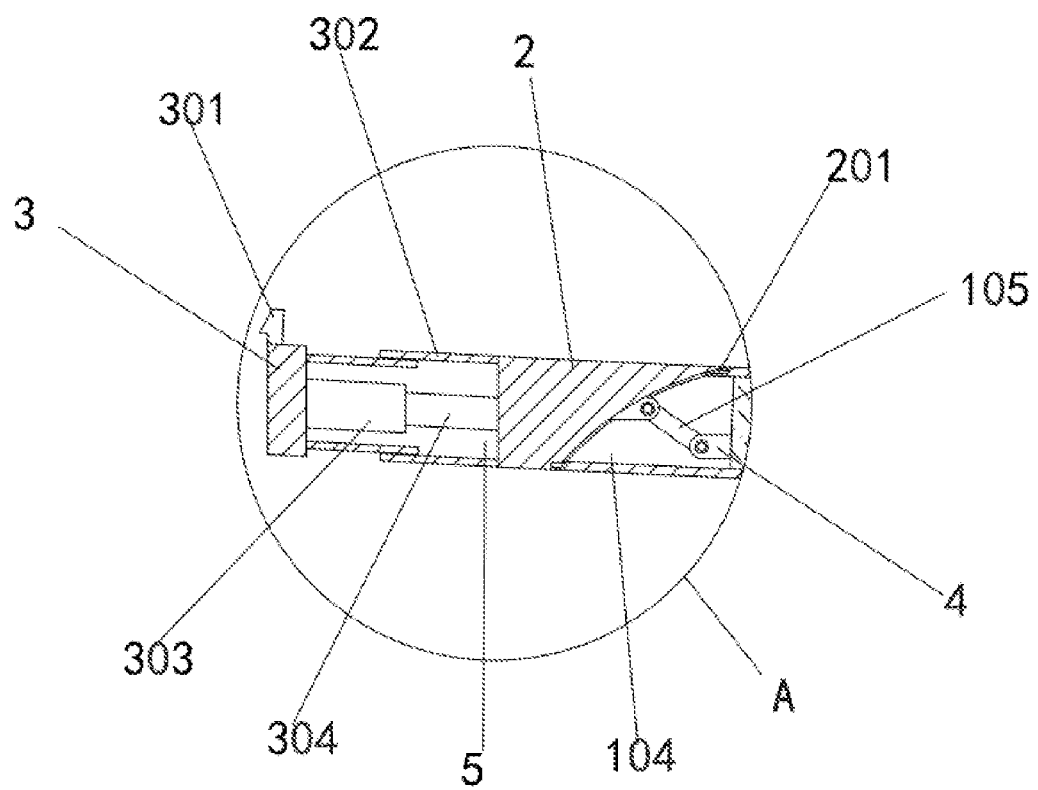
FIG. 3 is an enlarged diagram at a position A in FIG. 2 of the application.
Figure 4:
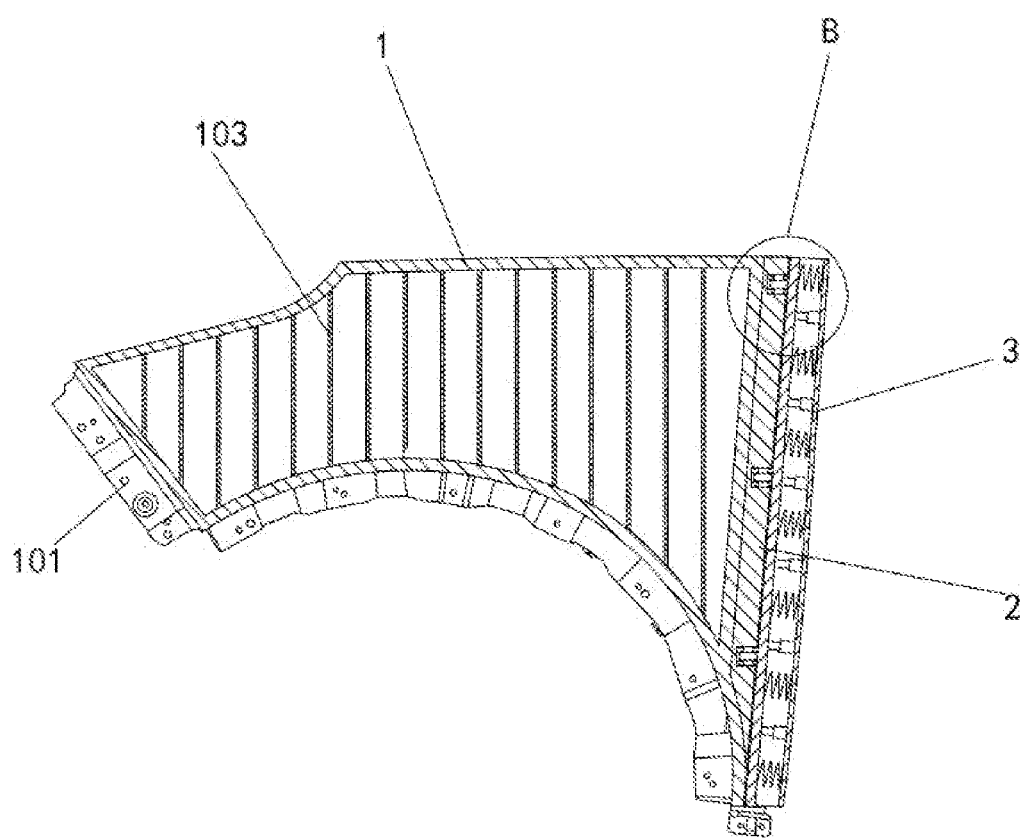
FIG. 4 is a back perspective of a fender main body of the application.
Figure 5:
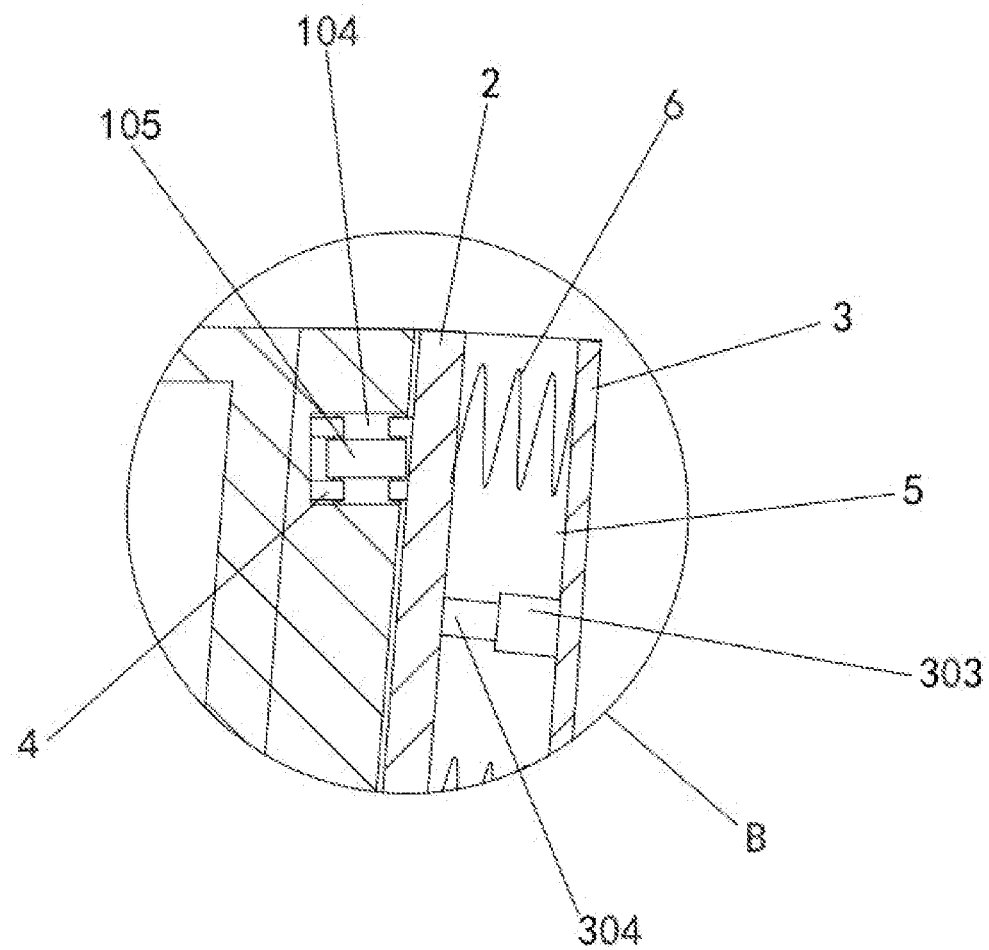
FIG. 5 is an enlarged drawing at a position B in FIG. 4 of the application.
Figure 6:
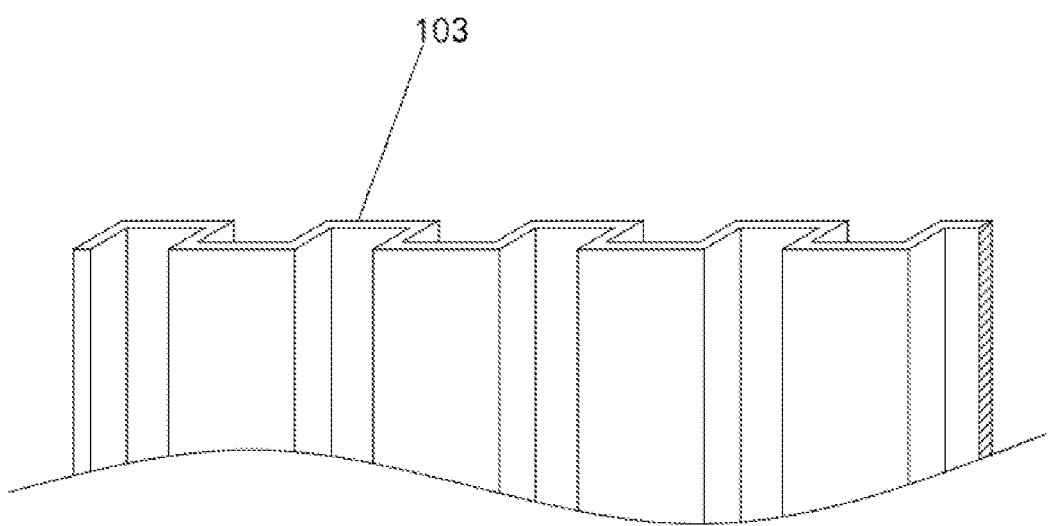
FIG. 6 is a stereogram of a kinetic energy absorber of the application.

Referring to FIGS. 1 to 6, schematic diagrams of a decomposition structure and a plane structure of an automobile fender are provided.

An automobile fender includes a fender main body 1. A right side of the fender main body 1 is provided with a first connecting plate 101, a lower side of the fender main body 1 is provided with a second connecting plate 102, and the second connecting plate 102 is arc-shaped.

In specific implementation, a kinetic energy absorber 103 is mounted in the fender main body 1, the kinetic energy absorber 103 is made of aluminum, the thickness is between 2 mm and 4 mm, and the kinetic energy absorber 103 as a whole is continuously and vertically bent at right angles.

In specific implementation, a squeezing guide piece 2 is mounted at a left side of the fender main body 1, that is, the side close to an automobile door body, one side, which is in contact with the squeezing guide piece 2, of the fender main body 1 is a cambered surface, one side, which is in contact with the fender main body 1, of the squeezing guide piece 2 is connected to a mounting inserting rod 201, and the fender main body 1 is provided with an inserting groove matched with the mounting inserting rod 201, so as to ensure that the fender main body 1 and the squeezing guide piece 2 are connected.

In specific implementation, one side, close to the squeezing guide piece 2, in the fender main body 1 is provided with a mounting groove 104, a first hinged seat 4 is mounted in the mounting groove 104, the first hinged seat 4 is connected to a guide rod 105, one side of the squeezing guide piece 2 is provided with the first hinged seat 4 which is the same as the fender main body 1, extends into the mounting groove 104, and is connected to the other end of the guide rod 105, and the squeezing guide piece 2 and the first hinged seat 4 on the fender main body 1 are arranged in a mutually staggered manner.

In specific implementation, a side buffer strip 3 is mounted at a left side of the squeezing guide piece 2, a spring is mounted between the left side of the squeezing guide piece 2 and the side buffer strip 3, the side buffer spring 3 is provided with a clamping piece 301 connected to an automobile body, a telescopic sleeve 303 and a telescopic rod 304 are mounted between the side buffer strip 3 and the squeezing guide piece 2, the telescopic sleeve 303 is sleeved over an outer side of the telescopic rod 304, and the telescopic rod 304 moves in the telescopic sleeve 303, so as to ensure that the squeezing guide piece 2 moves while limiting the movement thereof in the right direction.

In specific implementation, a plurality of groups of structures composed of a first connecting rod 303 and a second connecting rod 304 are arranged in a longitudinal gap between the squeezing guide piece 2 and the side buffer strip 3 at equal intervals, one side, close to the side buffer strip 3, of the squeezing guide piece 2 is provided with a baffle plate 302, and the baffle plates 302 on both sides are partially overlapped.

A working principle is as follows.

The kinetic energy absorber 103 is mounted in the fender main body 1, the kinetic energy absorber 103 is made of aluminum, the thickness is between 2 mm and 4 mm, and the kinetic energy absorber 103 as a whole is continuously and vertically bent at right angles, so that when impacted, the fender main body 1 is deformed at right angle bends of the kinetic energy absorber 103, so as to absorb the kinetic energy to the greatest extent, reduce the deformation range of the fender main body 1, and avoid the fender main body 1 from moving to and squeezing a front side of an automobile. Then, the squeezing guide piece 2 is mounted at the left side of the fender main body 1, one side, which is in contact with the squeezing guide piece 2, of the fender main body 1 is the cambered surface, one side, which is in contact with the fender main body 1, of the squeezing guide piece 2 is connected to the mounting inserting rod 201, and the fender main body 1 is provided with the inserting groove matched with the mounting inserting rod 201, so that when the impact squeezing range is large and the fender main body 1 is driven to move to the squeezing guide piece 2, the mounting inserting rod 201 is broken first, and the fender main body 1 moves outwards along the cambered surface of the squeezing guide piece 2, that is, the side far away from the automobile, thereby avoiding the fender main body 1 from squeezing a door body even under continuous impact. One side, close to the squeezing guide piece 2, in the fender main body 1 is provided with the mounting groove 104, the first hinged seat 4 is mounted in the mounting groove 104, the first hinged seat 4 is connected to the guide rod 105, one side of the squeezing guide piece 2 is provided with the first hinged seat 4 which is the same as the fender main body 1, extends into the mounting groove 104, and is connected to the other end of the guide rod 105, and the squeezing guide piece 2 and the first hinged seat 4 on the fender main body 1 are arranged in a mutually staggered manner, so that when the fender main body 1 moves to the squeezing guide piece 2, the first hinged seat 4 is ejected out under the action of the inclined guide rod 105, so as to improve the deflection efficiency of the fender after being squeezed to move. Finally, the side buffer strip 3 is mounted at the left side of the squeezing guide piece 2, the spring is arranged between the left side of the squeezing guide piece 2 and the side buffer strip 3, the side buffer spring 3 is provided with the clamping piece 301 connected to the automobile body, the telescopic sleeve 303 and the telescopic rod 304 are mounted between the side buffer strip 3 and the squeezing guide piece 2, and the telescopic sleeve 303 is sleeved over the outer side of the telescopic rod 304, so that when deflecting from the moving direction of the fender main body 1, the squeezing guide piece 2 squeezes the spring between the squeezing guide piece and the buffer side strip 3, thereby further absorbing the kinetic energy transmitted by the fender main body 1, and achieving the effect of zero contact with the front side of the vehicle. One side, close to the side buffer strip 3, of the squeezing guide piece 2 is provided with the baffle plate 302, and the baffle plates 302 on both sides are partially overlapped, so as to avoiding sediment from entering between the squeezing guide piece 2 and the side buffer strip 3 in daily use.

What is claimed is:

1. An automobile fender, comprising a fender main body, a first connecting plate, and a second connecting plate, wherein a kinetic energy absorber is mounted in the fender main body, a guide member is mounted at one side of the fender main body to deflect a displacement generated by an impact, a side buffer strip capable of absorbing an impact kinetic energy is mounted at a left side of a squeezing guide piece, a buffer mechanism is arranged between the left side of the squeezing guide piece and the side buffer strip, each side, close to the side buffer strip, of the squeezing guide piece is provided with a baffle plate, and the baffle plates on both sides are partially overlapped.

2. The automobile fender according to claim 1, wherein the guide member comprises the squeezing guide piece and a guide rod, one side, close to the squeezing guide piece, in the fender main body is provided with a mounting groove, a first hinged seat is mounted in the mounting groove, the first hinged seat is connected to one end of the guide rod, and one side of the squeezing guide piece is provided with the first hinged seat which is the same as the fender main body.

3. The automobile fender according to claim 1, wherein the kinetic energy absorber is made of aluminium, and the kinetic energy absorber as a whole is a continuously bent at right angles.

4. The automobile fender according to claim 2, wherein the first hinged seat on the squeezing guide piece extends into the mounting groove and is connected to the other end of the guide rod, one side, which is in contact with the squeezing guide piece, of the fender main body is a cambered surface, and one side, which is in contact with the fender main body, of the squeezing guide piece is connected to a mounting inserting rod.

5. The automobile fender according to claim 1, wherein a telescopic sleeve and a telescopic rod are mounted between the side buffer strip and the squeezing guide piece, and the telescopic sleeve is sleeved over an outer side of the telescopic rod.

6. The automobile fender according to claim 5, wherein the buffer mechanism arranged between the left side of the squeezing guide piece and the side buffer strip is a spring, and a plurality of groups of structures composed of the telescopic sleeve and the telescopic rod are arranged in a gap between the squeezing guide piece and the side buffer strip.

\* \* \* \* \*